US007349826B2

(12) United States Patent
Subramanian et al.

(10) Patent No.: US 7,349,826 B2
(45) Date of Patent: Mar. 25, 2008

(54) CAUSAL LADDER MECHANISM FOR PROACTIVE PROBLEM DETERMINATION, AVOIDANCE AND RECOVERY

(75) Inventors: Balan Subramanian, Cary, NC (US); Nanchariah Raghuveera Chalasani, Fairfax, VA (US); Javed Rahman, Medford, MA (US); Ajamu A. Wesley, Marlborough, MA (US)

(73) Assignee: International Business Machines Corporation, Armonk, NY (US)

( * ) Notice: Subject to any disclaimer, the term of this patent is extended or adjusted under 35 U.S.C. 154(b) by 3 days.

(21) Appl. No.: 11/438,875

(22) Filed: May 23, 2006

(65) Prior Publication Data

US 2007/0276631 A1  Nov. 29, 2007

(51) Int. Cl.
G06F 11/30 (2006.01)
(52) U.S. Cl. .................. 702/185; 455/431
(58) Field of Classification Search .......... 702/57, 702/58, 182–185; 706/15, 20; 705/8; 703/14; 709/201, 232; 714/11, 26, 38, 43, 728; 455/431
See application file for complete search history.

(56) References Cited

U.S. PATENT DOCUMENTS

| | | | |
|---|---|---|---|
| 4,649,537 A | 3/1987 | Rosswurm et al. | |
| 5,123,017 A | 6/1992 | Simpkins et al. | |
| 5,465,321 A | 11/1995 | Smyth | |
| 5,922,079 A | 7/1999 | Booth et al. | |
| 5,959,969 A | 9/1999 | Croslin et al. | |
| 6,141,770 A | 10/2000 | Fuchs et al. | |
| 6,353,815 B1 | 3/2002 | Vilim et al. | |
| 6,401,226 B1 | 6/2002 | Maeno | |
| 6,557,120 B1 | 4/2003 | Nicholson et al. | |
| 6,801,949 B1 | 10/2004 | Bruck et al. | |
| 6,862,697 B1 | 3/2005 | Moran et al. | |
| 6,865,591 B1 | 3/2005 | Garg et al. | |
| 2005/0233739 A1* | 10/2005 | Forbes et al. ............... 455/431 | |

FOREIGN PATENT DOCUMENTS

EP         0335507 A2    10/1989

OTHER PUBLICATIONS

I. Rish, et al, "Real-time Problem Determination in Distributive System Using Active Probing," IEEE Fault Management, Session Three, pp. 133-146 (2004).

* cited by examiner

Primary Examiner—John Barlow
Assistant Examiner—John Le
(74) Attorney, Agent, or Firm—Stephen Calogero; Rudolph J. Buchel, Jr.

(57) ABSTRACT

A plurality of causal ladder is assembled in advance from component system events taken from previous system failures. The ladders classify the various transitions the system goes through from one set of observed states to another in multiple stages representing issues of differing urgency, importance and need for remediation. These stages are used at runtime determine the criticality of any abnormal system activity and to accurately predict the component failure prior to the system crashing. Each ladder comprises a plurality of elevated stages representing criticality of the problem. At runtime, the causal ladder engine correlates real-time events received from the system to stages of one or more pre-constructed causal ladders and identifies a probable problem (and/or the faulty component) from the corresponding causal ladder. The causal ladder engine also determines the stage of the problem from event occurrences. At each stage, a different potential solution is identified for the problem.

20 Claims, 5 Drawing Sheets

CAUSAL LADDER MECHANISM FOR PROACTIVE PROBLEM DETERMINATION, AVOIDANCE AND RECOVERY

BACKGROUND OF THE INVENTION

The present invention relates representing a worsening system state transition as a causal sequence and using the causal sequence at runtime for problem determination avoidance and recovery from problems in complex systems.

Within the past two decades the development of raw computing power coupled with the proliferation of computer devices has grown at exponential rates. This growth along with the advent of the Internet has led to a new age of accessibility—to other people, other systems, and to information. This boom has also led to some complexity in the systems. The simultaneous explosion of information and integration of technology into everyday life has brought on new demands for how people manage and maintain computer systems.

Systems today are highly complex comprising of numerous components (servers, virtual machines, CPUs) from different vendors operating in a geographically distributed environment. A clustered Enterprise Application Server environment, Pervasive Computing environment are some examples of such complex systems. Also, these systems are dynamic, where new components can join to provide additional functions while the entire system is running. Conversely, components of the system can leave at runtime.

Additionally, the complexity of these systems and the way they work together has and will create a shortage of skilled IT workers to manage all of the systems. The problem is expected to increase exponentially, just as the dependence on technology has. As access to information becomes omnipresent through PC's, hand-held and wireless devices, the stability of current infrastructure, systems, and data is at an increasingly greater risk to suffer outages and general disrepair One new model of computing, termed "autonomic computing," shifts the fundamental definition of the technology age from one of computing, to that defined by data. The term "autonomic" comes from an analogy to the autonomic central nervous system in the human body, which adjusts to many situations automatically without any external help. Similarly, the way to handle the problem of managing a complex IT infrastructure is to create computer systems and software that can respond to changes in the IT (and ultimately, the business) environment, so the systems can adapt, heal, and protect themselves. In an autonomic environment, components work together communicating with each other and with high-level management tools. They can manage or control themselves and each other.

Self healing technologies are one of the pillars of autonomic computing and on demand. Self-healing requires detecting problematic operations (either proactively through predictions or otherwise) and then initiating corrective action without disrupting system applications. The first step toward this direction is problem determination. Self-healing systems are typically rule driven. Rules define what the system should do to diagnose and correct a problem. However, most problem determination and mitigation solutions today assume that the system is entirely deterministic and hence use automation to fix problems based on rules developed at design time.

Traditionally, problems in complex systems are reactive in nature, typically by gathering and then inspecting log and/or trace files. The log/trace files contain raw data that is analyzed to extract meaning. However, these log/trace files do not have a way to capture any particular variations of a components behavior. Therefore, in a traditional diagnostic process, the rules are modified and/or components re-instrumented to accommodate the behavior variations.

BRIEF SUMMARY OF THE INVENTION

The present invention relates to predicting problem severity by assembling a plurality of causal ladders for each of a plurality of problems that resulted in a past system failure. Each of the plurality of causal ladders comprises a plurality of sequential stages of criticality for the respective problem. At least one event occurrence is correlated to each of the plurality of sequential stages, each of the correlated event occurrence are indicative of criticality of the problem at a respective stage of the causal ladder. A runtime system event is received and compared to the correlated event occurrences or each of the plurality of sequential stages of criticality for each of the plurality of causal ladders. A causal ladder is identified in which the received system event matches a correlated event occurrence for one of the plurality of sequential stages of criticality for at least one causal ladder and one of the sequential stages of criticality for the identified causal ladder is also identified. A solution to the problem is based on the identified causal ladder and the sequential stage of criticality identified for the ladder.

BRIEF DESCRIPTION OF THE SEVERAL VIEWS OF THE DRAWINGS

The novel features believed characteristic of the present invention are set forth in the appended claims. The invention, will be best understood by reference to the following description of an illustrative embodiment when read in conjunction with the accompanying drawings wherein:

Figure 1:
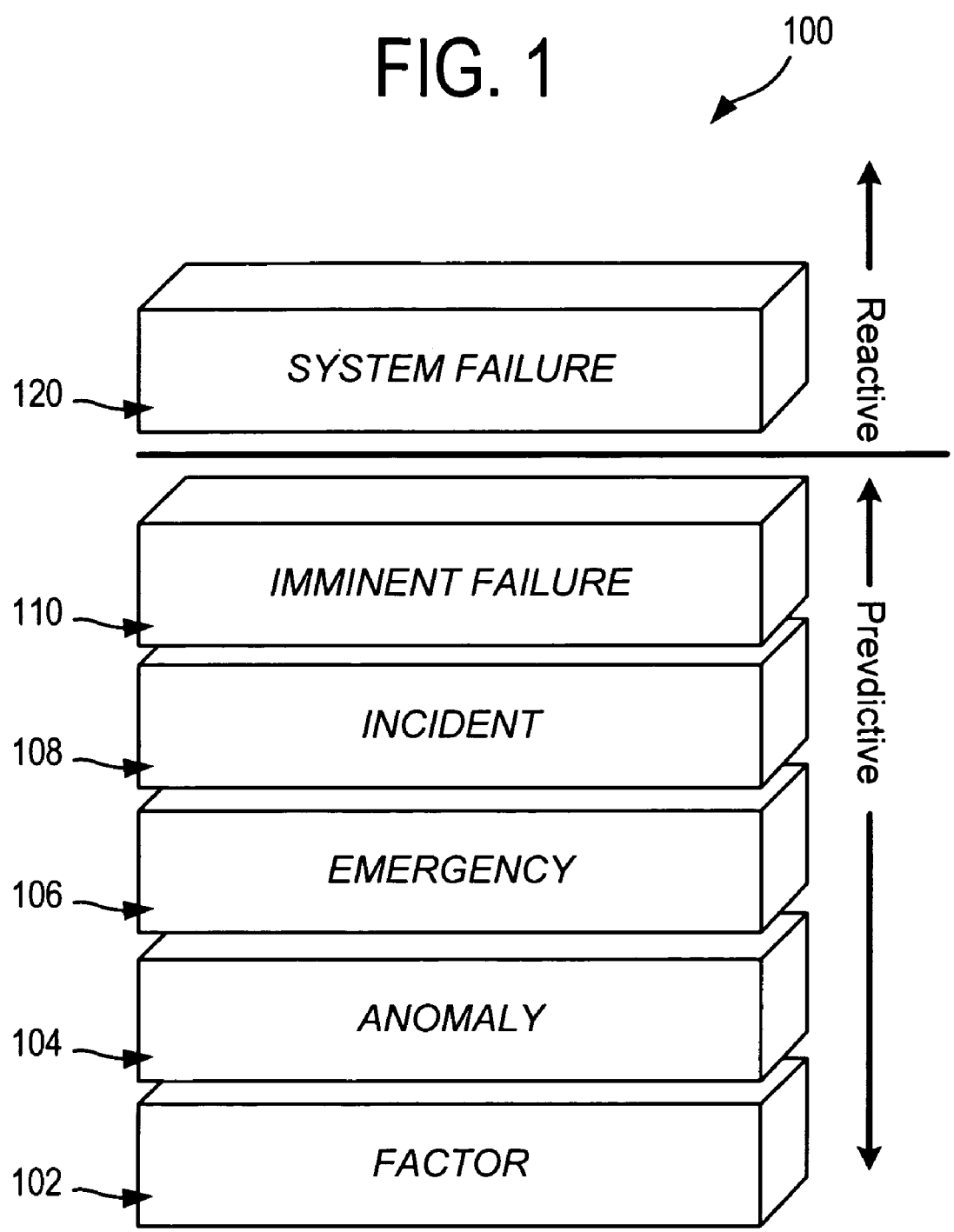
FIG. 1 is diagram of causal ladder, depicting the predictive nature of the causal methodology of a complex system in accordance with one exemplary embodiment of the present invention.

Other features of the present invention will be apparent from the accompanying drawings and from the following detailed description.

DETAILED DESCRIPTION OF THE INVENTION

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit" or "module." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Moreover, the computer readable medium may include a carrier wave or a carrier signal as may be transmitted by a computer server including internets, extranets, intranets, world wide web, ftp location or other services that may broadcast, unicast or otherwise communicate an embodiment of the present invention. The various embodiments of the present invention may be stored together or distributed, either spatially or temporally across one or more devices.

Computer program code for carrying out operations of the present invention may be written in an object oriented programming language such as Java, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The present invention is directed generally to using causal ladder mechanism to determine the criticality of any abnormal system activity. A causal ladder represents the sequence of sets of observed system states for problems which will ultimately lead to a system crash. A causal ladder classifies the various transitions the system goes through from one set of observed states to another in multiple stages representing issues of differing urgency, importance and need for remediation. System failure can result from the failure of a single component in that system and significantly, the failure of a single component can be accurately predicted by correctly identifying a sequence of causal events related to the abnormal operation of the component, leading up to the failure in the system. System events can be correlated to stages of causal ladders. Such a causal ladder can be built on top of a stochastic model, such as hidden Markov models (HMMs), which different parts of the model associated with different levels of the causal ladder.

The concept of a causal ladder helps isolate different stages in the transformation of factors and issues into serious system failures. Each stage can be handled independently within the constraints of policy and severe problems can be averted by decomposing the severe problem into steps that led up to the problem and handling issues within these steps as and when they occur. The causal ladder mechanism provides administrators with crucial information for assessing the criticality of abnormal operating, such as: the identity of one or more components in peril or operating abnormally, thereby enabling the administrator to monitor the suspect component(s) for further abnormal operations; the severity of the problem, and a corresponding estimate for the time to failure for the component (a window of opportunity for implementing a fix), from the causal stage corresponding to the system events; and; an opportunity to implement the best and most effective course of remedial action for preempting a component failure based on the estimated time to failure, the time for implementing the fix and the likelihood of the fix being effective based on policy and an order of fixes using acquired knowledge or success rate. In other words, the mere fact that a runtime event correlates to a stage of a preassembled causal ladder indicates that the system is at risk of failing, in an estimated time and at least one remedy is available for consideration to prevent the system failure.

Most system failures can be predicted by identifying one or more chain of causal events associated with the failure. The aim is to assemble system events, from previous system failures, into causal ladders, that accurately predict the failure of a particular component prior to the system going down. A system may crash as a result of loosing different components, thus, it should be appreciated that multiple causal ladders will be assembled to accommodate any possible component failure scenario that results in that system's failure. On the other hand, the failure of a particular component may be predicted on two of more unique sequences of causal events, that is, events in the system can overlap between different causal ladders. Thus, some component failures may be accurately predicted by two or more causal ladders, and hence, the resulting system failure may also be predicted by identifying either or both of the two independent casual ladders. It should also be appreciated that in the latter stages of a system's collapse, more than one component is likely to fail. Consequently, a system in critical failure mode will throw exceptions that correlate to the higher levels of multiple causal ladders (for different component failures), making it possible to accurately predict a system failure from more that one causal ladder and offering multiple opportunities for keeping a faltering system alive while attempting a fix for the primary problem.

Just as some component failures may be predicted by multiple causal ladders, the corollary is also true; a single chain of causal events may be indicative of two or more different component failures in a system. Thus, two different types of component failures may be accurately predicted by a single causal ladder. Since the causal ladder approach is predictive in nature, the identity of the component failure is not as important as identifying the stage of the causal events (the level of the causal ladder) that will ultimately result in system failure and then implementing an appropriate fix for the particular stage. The intent is not to diagnose a failure, but to identify a particular sequence of causal events, as early in the sequence as possible, in order to implement a fix before the failure is imminent. A single causal ladder is typically associated with a single set of solutions, regardless of which component or components ultimately fail. Accordingly, an appropriate fix, i.e., the highest rated solution, is based on the stage of the causal ladder, that is, the likelihood of the fix being effective based on policy and an order of fixes for the time to failure in view of the time for implementing a particular fix, and not on the identity of the component.

A causal ladder is constructed in advance for a particular system that contains multiple components for each catastrophic system failure that can happen in the system. The causal ladders are assembled from event information generated during previous failure episodes. Initially, logs or tracking data are gathered from previous system failures. The data should be time stamped in order to accurately estimate the time before an ultimate failure of the component. Each causal ladder represents a sequence of sets of observed system states that represent problems that will ultimately result is system failure. Furthermore, every stage or level of a causal ladder is associated with a possibly singleton set of observed states that indicates that a current problem should be elevated to that stage of the causal ladder. Optimally, each causal ladder is built on top of a stochastic model in which different parts of the model associated with different stages of the causal ladder. As mentioned above, causal events from the system can overlap between different causal ladders leading to the same component failure or different component failures so multiple causal ladders may be assemble from the same log data. Therefore, a sufficient amount of data is necessary to accommodate the learning curve to distinguish both cases.

FIG. 1 is diagram of causal ladder, depicting the predictive nature of the causal methodology of a complex system in accordance with one exemplary embodiment of the present invention. The theory of a causal ladder is an analogy borrowed from accident analysis for automobiles. The grouping of states under each stage (or ladder rung) is a central aspect of the causal ladder. Sequence 100 of the stages leading to a failure includes predictive/proactive stages and reactive stages. The reactive stages of a failure are defined as the events that will not respond, and therefore remedial action is not possible to stop a failure, because the system no longer functions as required, i.e., system failure 120. Those stages necessarily involve invoking a reactive protocol, such as diagnosing a problem that resulted in a failure.

The predictive/proactive problem determination stages are the stages (levels or rungs) of the causal ladder (stages 102-110) in which the system will respond to fixes and remedial actions directed toward a problem resolution. The aim is to identify a causal ladder for the particular problem at a stage, or level, of the ladder where sufficient time remains prior to a failure to implement a remedy, thereby averting a system crash. The causal ladder depicted in FIG. 1 is comprised of five exemplary proactive stages; factor 102, anomaly 104, emergency 106, incident 108 and imminent failure 110, however the five stage causal ladder is depicted herein is merely exemplary. A particular component failure scenario may be represented with more or less that separate five finite causal stages, and may in fact be represented with multiple causal ladders of varying number of stages. However, although the disparate failures of a system may be represented with causal ladders with different stages or by having any number of stages, optimally the types and number of finite causal ladder stages are standardized for a particular system to componentization purposes.

The causal ladder mechanism helps isolate different stages in the transformation of factors and issues into serious system failures. Each stage can be handled independently within the constraints of policy for that stage and severe problems can be averted by decomposing the severe problem into steps that led up to the problem and handling issues within these steps as and when they occur. Moreover, often a root cause of a potential failure can be identified with sufficient time to implement a less invasive fix, by calling an appropriate action routine (i.e., the highest rated solution action). In accordance with one exemplary embodiment of the present invention, a causal ladder can be built on top of a stochastic model, such as hidden Markov model (HMM), in which different parts of the model associated with different stages of the causal ladder. A stochastic model is built of each type of system failure from data gathered from previous failures. The causal ladders assembled from the model are used for evaluating real-time data from the system. Additionally, the stochastic model may receive continual training using real-time event information from the system, which in turn allows the discrete stages of the respective causal ladders to be refined with respect to the current failure information.

Each stage, or rung, (102-110) of a causal ladder represents certain specific information about the state of the health of a system based on observations from a previous failure, or failures of a system component. The various transitions that a system goes through from one set of observed states to another are classified in multiple casual ladder stages representing issues of differing urgency, importance and need for remediation. Each of these stages has its own set of associated policies and actions to take. The policies are also based on the probability of transition from one stage to another, which is observed from the trained stochastic model. Each stage also provides a window of opportunity in which the problem can be resolved.

The stage with the lowest probability of a resulting system failure is factors stage 102. "Factors" represents system facts, typically about runtime environment observed during previous failure. Present runtime events that correlate to factors stage 102 of a causal ladder indicate a definite propensity for a system failure. The identical event(s) in another context (where the event(s) does not correlate to a causal ladder) is merely representative of runtime values for the system. For instance, a system tracks the number of active users as a factor of the system. If in a previous runtime environment the number of active users increased to an amount that precipitated a database failure, resulting in a system crash, then the factor for that number of active users would correlate to a factors stage for a causal ladder representing a database failure.

Even though the factors stage is the lowest stage of the causal ladder, and indicates the lowest probability of a component failure, it is possible to rank potential solutions based on system policy, order of fixes, past success, etc. Identifying a root cause of a potential failure in the lower stages provides sufficient time to implement a less invasive fix. It should, however, be understood that most remedial action may result in unwanted, but necessary negative side effects. Therefore, with events that correlate to the lower levels of the causal ladder, it may be preferable to merely monitor the suspect component for other indications of abnormal operation rather than immediately implementing a remedial action. Monitoring is only possible when the estimated time to failure is much longer than the time necessary for implementing an appropriate remedy. As time elapses, and the estimated time to failure decreases, remedies that require more time than the time to failure are eliminated from the set of potential solutions. In most cases this the estimated time to failure in the factors stage is relatively long, longer than the time to implement any of the remedial actions and the effected component can be monitored without risk of a system failure. Then, the component exhibits some type of abnormal operation that is consistent with the failure type represented in the causal ladder, is an appropriate remedy selected (i.e., an appropriate remedy is the fix with the highest rating for the particular stage causal ladder using system policy and order of fixes based upon acquired knowledge or previous successes is selected).

The next higher probability of a system component failure is represented at the abnormal stage or rung of the causal ladder. Abnormal stage 104 represents abnormal facts, usually deviations from expected state and/or values that are indicative of future failure. Factor stage 102 transcends to the elevated level of anomaly stage 104 when the facts received from the system deviate from expected values. Abnormal stage 104 provides further verification of that the identity of the failure represented by the causal ladder is accurate. At this stage, and similar to the factors stage, potential solutions are ranked based on system policy, order of fixes, past success, etc., and the best solution for the problem selected based on the highest ranking solution. Here again, in cases where the problem is identified early in the causal sequence, a less invasive fix can be implements with fewer negative side effects. However, the set of potential solutions in abnormal stage 104, and rankings, will probably be different from those associated for factors stage 102. Typically, each stages of a causal ladder mandates a unique a set of potential remedies for preventing a component failure at the particular stage of the failure. Remedies that might be appropriate at one stage may rank low due to the policies associated with another stage, or may be excluded from consideration because the remedy cannot be implemented within the estimated time period until the component fails.

The next stage above the anomaly level of the causal ladder is the emergency stage. Emergency stage 106 is where the system anomalies affect the system's performance and typically results in system warnings. The emergency stage may be the optimal level of the causal ladder for identifying and implementing a solution. Frequently, the central component causing all the events in the system failing will reach the emergency stage first. Thus, successfully acting on problems at the emergency level of a causal ladder has a high probability of resolving the central problem in the system. Furthermore, the component operating abnormally will not have adversely affected the operation of other system components at this stage. Resolving the problem at the emergency stage lessens the chances of a component failure, either the component being monitored or another component in the system, because the problem is resolved prior to exceptions being thrown.

There is a paradox, more resources required for computing a root cause as the events correlate to higher levels of the causal ladder, but more information is gained for isolating the root cause at the higher stages of the ladder. Therefore, acting at the lower stages of a causal ladder lessens the chances of identifying and solving the root cause and increases the likelihood that the system will be adversely affected by unwanted side effect from the fix. However, merely monitoring a problem until the latter stages of a casual ladder consumes system valuable recourses at a time when the system resources are further burdened by the problem.

The next higher level stage on the causal ladder is the incident stage. Incident stage 108 may result from a lower level failure that the system recovered from, or, alternatively, incident stage 108 may represent exceptions that were caught and resolved, but these same exceptions may culminate towards system failure. Once exceptions are thrown, the probability that other system components will be affected is much greater. The central problem will often precipitate abnormal operation in other system components. Thus, successfully resolving the central problem in the system has a high probability of resolving the abnormal operation of other components in the system. At this stage, the highest ranking fix should be identified and immediately implemented. However, because other system components may now also be involved, i.e., at elevated stage of their respective causal ladders, those components should also be monitored and action taken if appropriate.

The final and highest probability of a system failure is the imminent failure. Imminent failure stage 110 indicates that system will fail unless some action is taken immediately. At imminent failure stage 110, the time estimated time to failure should be carefully compared to the amount of time for the action or resolution prior to implementing the solution. At this point, it may the more advantageous to execute a script for backing up key data in anticipation of a system failure.

It should be mentioned that in many cases, a runtime event or set of events correlates to a factor stage in only a single causal ladder. Those cases offer an excellent opportunity to preempt a failure because the type of failure, and hence an appropriate remedy, can be identified with certainty from the single causal ladder. In this situation, the amount of time necessary for identifying the failure type is minimal and the remaining time-to-failure can then be devoted to implementing the best, least invasive and most effective course of remedial action for preempting a component failure can be implemented based on the estimated time to failure from the event, the time for implementing the fix and the likelihood of the fix being effective. However, events that correlate to the lower stages of the causal ladder have a higher probability to correlating to multiple causal ladders, even though only a single system component is in peril.

The converse is that a single event, or set of events, correlates to factor stages in multiple causal ladders. It is expected that an event that correlates to lower stages in the causal sequence will often correlate to multiple causal ladders as well. The correlation of a single event to multiple causal ladders creates the inference that multiple components are in jeopardy of failing and a conflict arises as to how to implement the fix(es). The inference that multiple components are failing is often incorrect, as the event information is simply too generic to delineate a specific component that is failing. A first inclination is to invoke remedial actions consistent with the policies of the particular stage for each causal ladder correlating to the event. This course of action will ensure that component failure is avoided, regardless of which suspect components is truly in jeopardy of failing. However, many remedial actions are quite invasive and have unintended, but necessary negative side effects that must be tolerated. Invoking remedial actions for all potential failures, without regard to correctly identifying the faltering component, may cause additional unintended negative side effects, unnecessarily. The unnecessary negative side effects can be avoided by correctly identifying the faltering component and then invoking only the highest ranking fix for that failure. For example, suppose the factors of a memory usage level correlates to both a factors stage on a causal ladder representing the database failure and a second factors stage on a second causal ladder representing the application server failure. If the highest ranking remedy for both failures is the same, the remedy can be safely implemented without creating any unnecessary negative side effects. If, however, the remedies are different, the system will suffer some unnecessary negative side effects associated with the unnecessary fixes. Hence, an inherent conflict often exists between the causal ladders for in the lower stages. This conflict can usually be resolved by monitoring the suspect components. Only when system information is received that elevates one of the causal ladders to a higher stage, thereby eliminating, or at least lessening the probability of another type of component failure, should remediation be invoked. It should understood that after the highest ranking fix has been invoked, the components associated with the conflicting causal ladders should be monitored for a time period in order to verify the accuracy of the fix. For instance, if no additional indications of abnormal operation are received for the monitored components within the estimated time to failure, it may be assumed that the implements fix was correct and the inference that the monitored components are failing is incorrect.

Events or phases of the system can overlap between different causal ladders leading to the same component failure as well as overlap between different causal ladders leading to different component failures. The learning curve for the system to accommodate the above two properties. Usage of probability and correlation to determine the criticality and association of any abnormal system activity to the causal ladder.

$$P(\text{Component} \times \text{Failure}) = \prod_{i=1}^{n} P(U_i \cap V_i \cap W_i \cap X_i \cap Y_i) \quad (1)$$

where, P(U) is a probability that a factor occurred;
P(V) is a probability that a particular anomaly occurred and is a dependent probability generation as P(V) is dependent upon P(U);
i→causal ladder 1;
$U_i$, $V_i$, $W_i$, $X_i$, $Y_i$→variables to determine the occurrence and completion of a particular level of the causal ladder; and
the independence of a causal ladder is assumed.

Each of the variables used represents all events, or subset of events, that must occur for completion of a particular level. The events may occur simultaneously, indicating joint probability or sequential indicating a sequential probability.

The probability that event x causes a component failure can be represented as:

$$P(C_f | x) = \frac{P(C_f \cap x)}{P(x)} \quad (2)$$

where, x→type of event occurred at a particular level in causal ladder; and
$C_f$→component failure.

The probability that event x at level 1 and event y at level 2 can cause a failure can be shown as:

$$P(C_f | x \cap y) = \frac{P(C_f \cap (x \cap y))}{P(x \cap y)} \quad (3)$$

where, P(x and y)→Depends on whether x and y are independent or dependent events.

Once the causal ladders are assembled, a correlation engine is used for correlating runtime events to ladders stages based upon probability. The correlation engine allows for distributed knowledge base building and thus sharing of information about probable leads to failure during runtime. With events correlating to a particular causal ladder, a remedial action or solution may be selected based on the solutions' ratings, the higher a solution rating, the more likely the action for remedying a problem at a particular stage will be successful. A rating may be computed for a solution based on three factors: 1) the condition probability of events with each of available causal ladders; 2) $T_{E\text{-}Failure}$→estimated time to failure for each of the causal ladders; and 3) $T_{repair}$→amount of time each of the respective actions or solutions take for a particular causal ladder.

As a practical matter, some runtime events associated with previously unknown or undiscovered types of failures will not readily correlate to a preassembled causal ladder the causal sequence not previously occurred or had not been detected. In those situations, human intervention may be necessary. Correlation engine 214 and causal ladder builder 216 may be accessed using human interface 218 for building a causal ladder on the fly or making new correlations to existing causal ladders.

Figure 2:
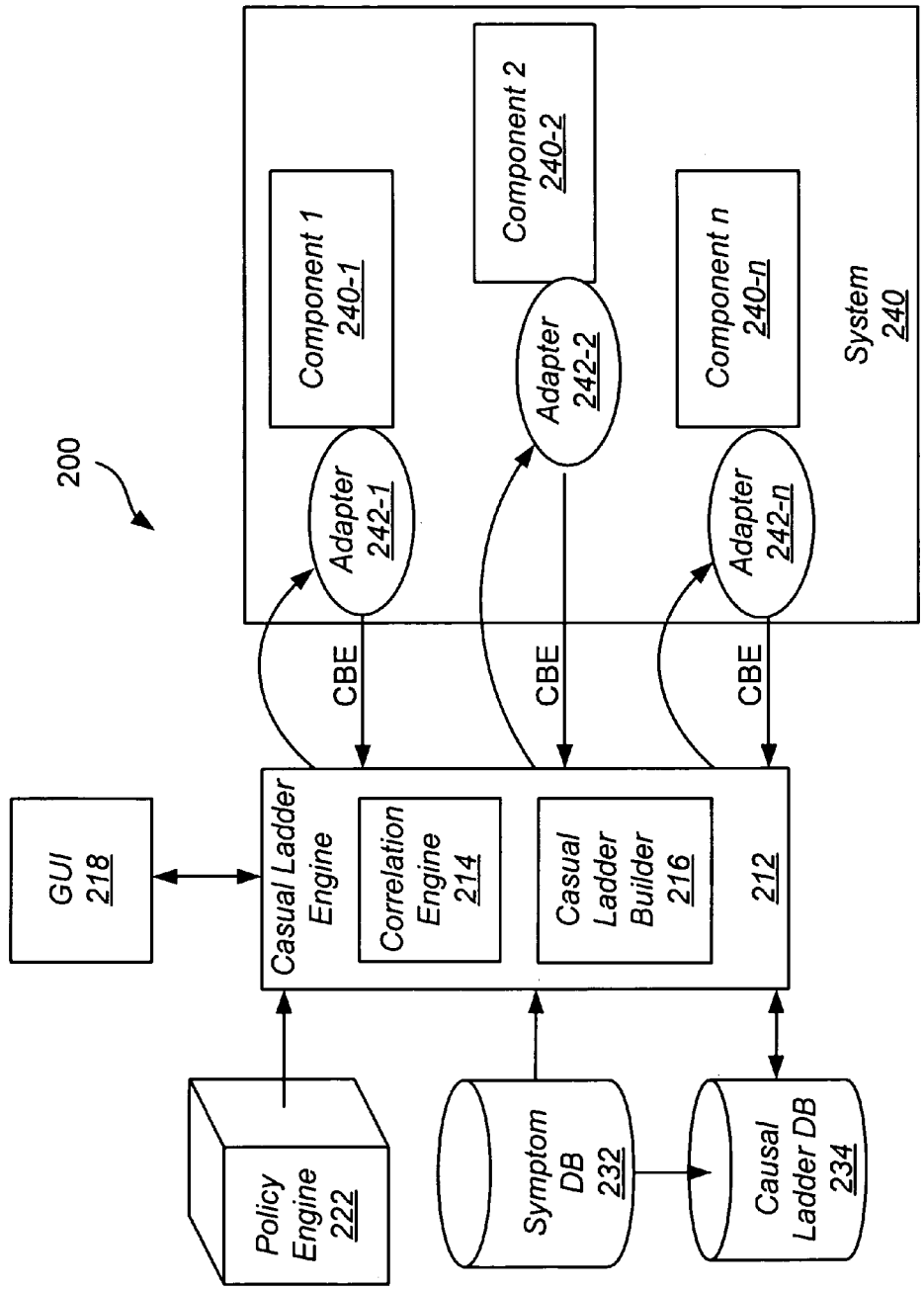
FIG. 2 is a diagram an autonomic environment in which the present invention is deployed for predicting the severity of a problem at runtime in accordance with an exemplary embodiment of the present invention.

FIG. 2 is a diagram an autonomic environment in which the present invention may be deployed. Autonomic environment 200 includes system 240 which further includes n individual components running in the system, depicted as component 1 240-1, component 2 240-2 through component n 240-*n*. Components 240-1 through 240-*n* interact with causal ladder engine 212 by formatting output data into a standard event format, such as CBE (Common Base Events) or WEF ((WSDM) Web Services Distributed Management Event Format) via adapters 242-1 through 242-n, corresponding to components 240-1 through 240-n (some components may have the native ability to generate events in a standard event format and thus the adapter may be unnecessary).

Causal ladder engine 212 operates in two discrete modes, ladder assembly mode (pre-runtime) and problem determination and failure avoidance mode (runtime). In the ladder assembly mode, at pre-runtime, causal ladder engine 212 assembles causal ladders for use in the runtime environment using causal ladder builder 216. Multiple causal ladders are constructed, at least one causal ladder for each component failure that resulted in a system crash. Typically, logs or tracking data from system failures are used for this purpose. The log data are first transformed to a standard event format, e.g., CBEs, which is then passed to causal ladder builder 216 where, for example, stochastic models (typically HMMs) are trained from the observations. A separate stochastic model represents each stage in a causal ladder. The probability of transition from one stage to another is observed from the trained stochastic models. The probability of transitions from one stage to another can be represented by the variables $U_i$, $V_i$, $W_i$, $X_i$, and $Y_i$ and the probability of a component failing can be determined using the variables in Equation 1.

Associated with each stage of every causal ladder is its own set of associated policies (invoked by policy engine 222) and remedial actions. The policies are also based on the probability of transition from one stage to another which is observed from the trained stochastic models. The remedial actions stored with the time for implementing the particular action ($T_{repair}$) in symptom database 232. Time stamp information from the events in the log data is used to estimate a time to failure ($T_{E\text{-}Failure}$) for that particular stage of the causal ladder. At runtime, the remedial actions associated with a stage that can be invoked (i.e., $T_{E\text{-}Failure} > T_{repair}$), are retrieved from symptom database 232 and ranked based on policies for the stage using policy engine 222, past effectiveness, etc.; the highest ranking solution is then invoked to avoid a component failure. The completed causal ladders are stored in causal ladder database 234.

Figure 3:
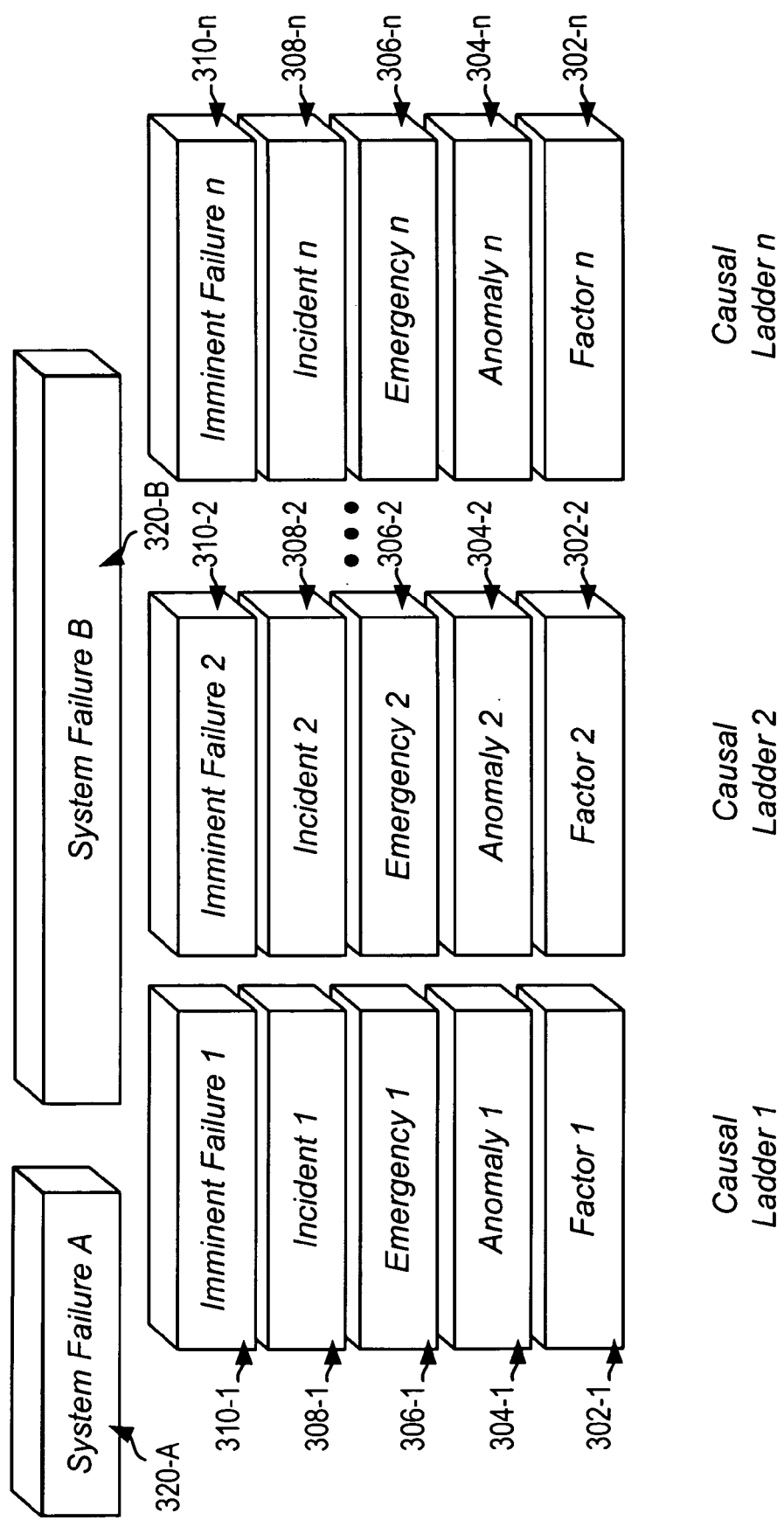
FIG. 3 is a diagram depicting multiple causal ladders constructed for a single type of problem, or system failure, system failure, in accordance with an exemplary embodiment of the present invention.
Figure 4:
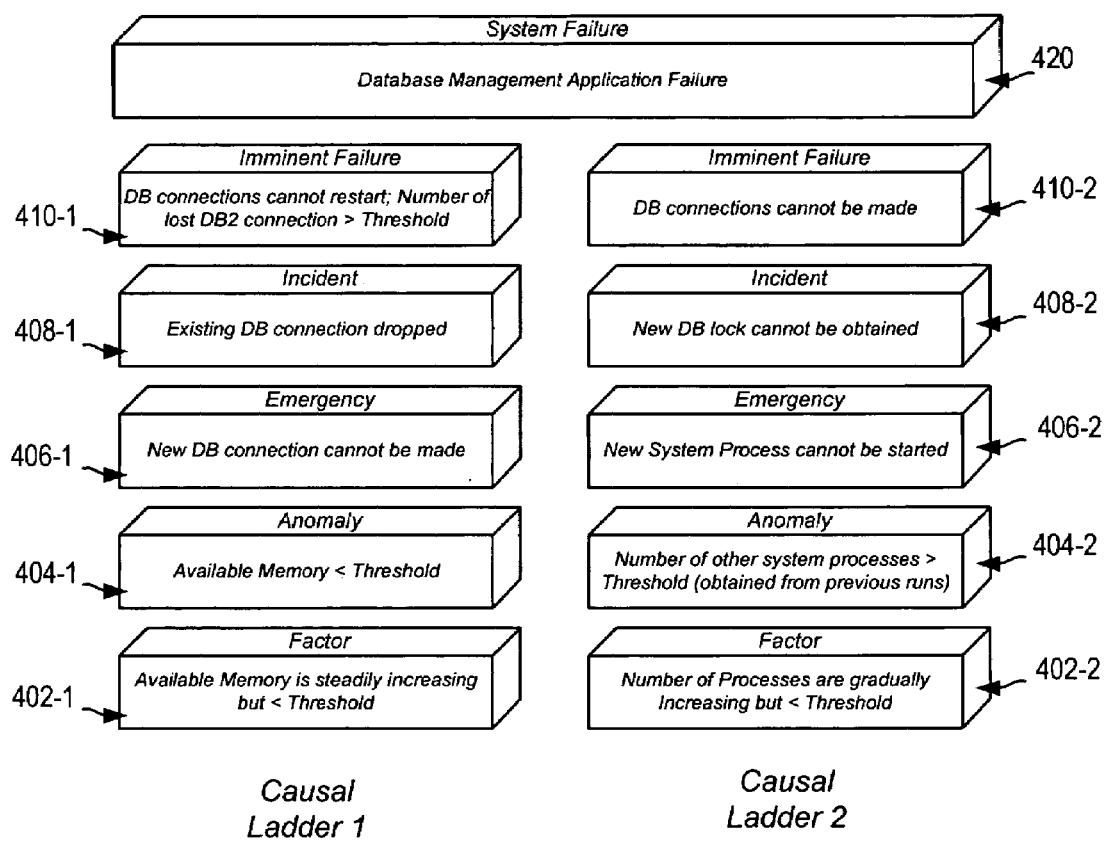
FIG. 4 a diagram depicting a pair of causal ladders showing the stages of a database failure in accordance with an exemplary embodiment of the present invention.

More particularly, prior to runtime casual ladder engine 212 receives event information that resulted in catastrophic system failures and, using causal ladder builder 216, construct at least one causal ladder for each system failure. As can be seen diagrammatically on FIG. 3, multiple causal ladders may be constructed for a single type of system failure, e.g., causal ladder 1 through causal ladder n each result in system failure B 320-B. While the causal stages (or rungs) represented in each of causal ladder 1 through causal ladder n are identical, the stages are representative of a particular sequence of sets of observed system states that lead to the failure are different (compare, for instance, the observations depicted in FIG. 4 for stages 402-1 through 410-1 for causal ladder 1 with the observations for stages 402-2 through 410-2 for causal ladder 2).

In problem determination and failure avoidance mode, at runtime, causal ladder engine 212 has three primary functions: 1) correlating real-time events received from the system to stages of pre-constructed causal ladders stored in causal ladder database 234 for identifying a potentially faulty component and determining the causal stage that the component is in; 2) selecting potential solutions from symptom database 232, and using policies for the particular stage invoked by policy engine 222, rating the potential solutions (this may be accomplished using condition probability of events with each of available causal ladders, $T_{E\text{-}Failure}$ the estimated time to failure and $T_{repair}$ the time to implement the repair); and; and 3) communicating the highest ranking fix(es) to the component corresponding to the causal ladder that the solution was derived (the solutions, or solution instructions are passed to the components as generic, high level commands or instructions). Typically, one of adapters 242-1 through 242-n receives and translates the high level instructions to a lower level script, or instructions, that is usable by respective components 240-1 through 240-n. In the event that the system events do not correlate to stages of a pre-constructed causal ladder, causal ladder engine 212 may, optionally, invoke causal ladder builder 216 to construct a new causal ladder for the catastrophic system failure and stores the resultant causal ladder in causal ladder database 234.

More particularly, at runtime the system outputs events (CBEs) to causal ladder engine 212. The CBE data are used by causal ladder builder 216 for training the stochastic model(s) with runtime data and, as necessary, updating event correlations to the causal ladder stages in causal ladder database 234. Simultaneously, correlation engine 214 attempt to correlate the CBE to stages of one or more causal ladders. If the event is the result of a new problem, the causal ladder for the problem is stored in causal ladder database 234. If, on the other hand, the event is a subsequent event for an ongoing problem, i.e., a previous event has correlated to the lower stages of a causal ladder representing the problem, then correlation engine 214 has already retrieve the ladder from causal ladder database 234. In the latter case, correlation engine 214 assesses the probability of a problem transitions a particular stage from the correlated events. Each causal ladder represents the sequence of sets of observed system states that represent problems which will ultimately lead to a crash and, for each stage, a set of potential solution can be rated based of several factors including available time, system policy and history of success for the solution with the problem. At any instant, the state of the runtime system may be represented by multiple causal ladders in various stages of distress, so it may be necessary to implement multiple actions simultaneously, or sequentially. Human interface 218 is provided for, among other things, making correlations and assembling causal ladders on the fly for cases in which abnormal operation events are received that do not correlate to a pre-constructed causal ladder in causal ladder database 234.

Returning to FIG. 4, a pair of causal ladders is depicted showing the stages of a database failure in accordance with an exemplary embodiment of the present invention. Each of causal ladders 1 and 2 is comprised of the identical stages (or rungs) of factor, anomaly, emergency, incident and imminent failure, however the events, or groups of events, necessary for transition from one stage to an elevated stage are different for each ladder because the root cause is different for each ladder. In this example, causal ladder 1 represent the stages of a database failure resulting from the root cause of inadequate memory, while causal ladder 2 represent the causal stages of a database failure resulting from the root cause of lack of available processing capacity. Ultimately, both cause ladders culminate in the failure of the database management system, but since the root causes are different, the remedial actions necessary for resolving the problem will most probably be different in each case, as well as the estimate time to failure, $T_{E\text{-}Failure}$, and the time for implementing the repair, $T_{repair}$.

Turning to the figure, the least severe events correlate to the lowest rung on the ladder, factor 402-1 for first scenario shown by causal ladder 1. In this scenario, factor 402-1 is reached by receiving event information from the system indicating that the available memory is steadily increasing, but below a threshold amount established as being necessary for the particular component, in this case the database managements system. Other components, that do not require that level of memory for their operation, would not be elevated to the factors stage in the failure sequence. Conversely (and not shown in the figure), factor stage 402-1 might also be reached where the amount of memory is above the threshold amount, but steadily decreasing toward the threshold.

Factor 402-2 of the second scenario represented by causal ladder 2 is transitioned by receiving information from the system that the number of processes running on the system is gradually increasing, but below a threshold amount set for the particular database management application therefore, the symptomatic event precipitating the factor stage is that the number of processes is increasing, though not over any threshold amount set for the database management application.

This point should be more evident from the fact the same symptomatic event may constitute different stages in the failure sequence, another point not fully appreciated in the prior art. For example, the inability to create new database connections represents only an emergency stage in the first scenario which essentially is an indication of some abnormal behavior. However, the identical symptom represents an imminent failure stage in scenario 2. Thus, if the operator identifies only events relating to the inability to create new database connections, that symptom is ambiguous as to whether it relates to a root cause involving the lack of available memory or the lack of available processing capacity. Clearly, if the inability to create database connects is a symptom of processing capacity, the symptom represents a much sever stage of failure than if it is a symptom of memory availability.

It should be fairly obvious that both factor 402-1, representing the slightly elevated risk of from the available memory being below a threshold amount, though increasing, and factor 402-2, representing the slightly elevated risk of failure from the number of processes running on the system gradually increasing, may relate to failure types other than a database management application. Therefore, these symptoms may represent the lowest rung on other causal ladders for other types of failures.

The next higher stage in the of causal ladder 1 scenario, anomaly 404-1, is reached by the symptomatic event of the available memory steadily increasing with the available memory still below the threshold amount, which is in turn, transitioned by receiving a warning that new database connection cannot be made, emergency stage 406-1. The corresponding stages of the causal ladder 2 are reached when the number of system processes increases above a threshold amount obtained from previous runs, anomaly stage 404-2 and with the occurrence of a warning that new processes cannot be started, emergency level 406-2 is transitioned. At this point, even though both causal ladders are at the emergency level, and each will ultimately result in a database management application failure (that will crash the system), the highest ranking solution for each is different because the symptoms, as demonstrated by the events, are different. Therefore, in each scenario the administrator will have a different estimated time to failure $T_{E\text{-}Failure}$ and, because each root problems appears to be unique, the solution actions will undoubtedly also be unique, the time for repair $T_{repair}$ will also be different for the scenarios.

In a prior art system which exhibits one of these symptoms, the operator would probably monitor the system for further symptoms that appear to be related to the initial symptoms. This is problematic because further symptoms may be missed, or instead may be overlooked if the symptom does readily appear to be related to the initial symptom(s). To a large extent, implementing a solution may rely on the skill of the operator. Thus, the prior art system may traverse several heightened stages in the casual failure sequence before the operator notices, or correlates the event to a specific problem. For instance, the first event that may be recognized as a precursor to a database failure might be the crossing of a threshold, such as the number of lost database connections exceeding a threshold amount. From the scenario represented causal ladder 1, it is clear that the crossing of that threshold means that the system is in an imminent stage of failure and remedial action should be undertaken immediately. However, since the prior art does not recognize a failure as sequence higher failure probabilities corresponding to specific symptoms, the root problem causing the lost database connections may not be apparent (for scenario 1 the root cause is lack of available memory). Thus, rather than attempt to clear memory for making new database connections, the operator might attempt other solutions in a futile attempt to save the system from crashing. The more immediate problem of the imminent stage of system failure may not be fully appreciated or the symptom may have been misdiagnosed as an initial stage of a failure sequence rather than the last possible stage before system failure. Moreover, because neither root cause is directly related to the database management system, the operator may never fully appreciate that the database management system is in peril until the problem is in the emergency stage, or worse.

In any case, both failure scenarios proceed through and on to imminent failure incident 410-1 and 410-2, by loosing database connections, incident 408-1, and then being unable to restart the connections and with the number of connection dropping below a preset threshold, imminent failure 410-1, and being unable to obtain a new database lock, incident 408-2, and receiving an indication that database connection cannot be made, imminent failure 410-2. At each stage, for each causal ladder, the system policy, order of fixes and time constraints will dictate a preferred solution (i.e., the highest ranking solution).

Figure 5:
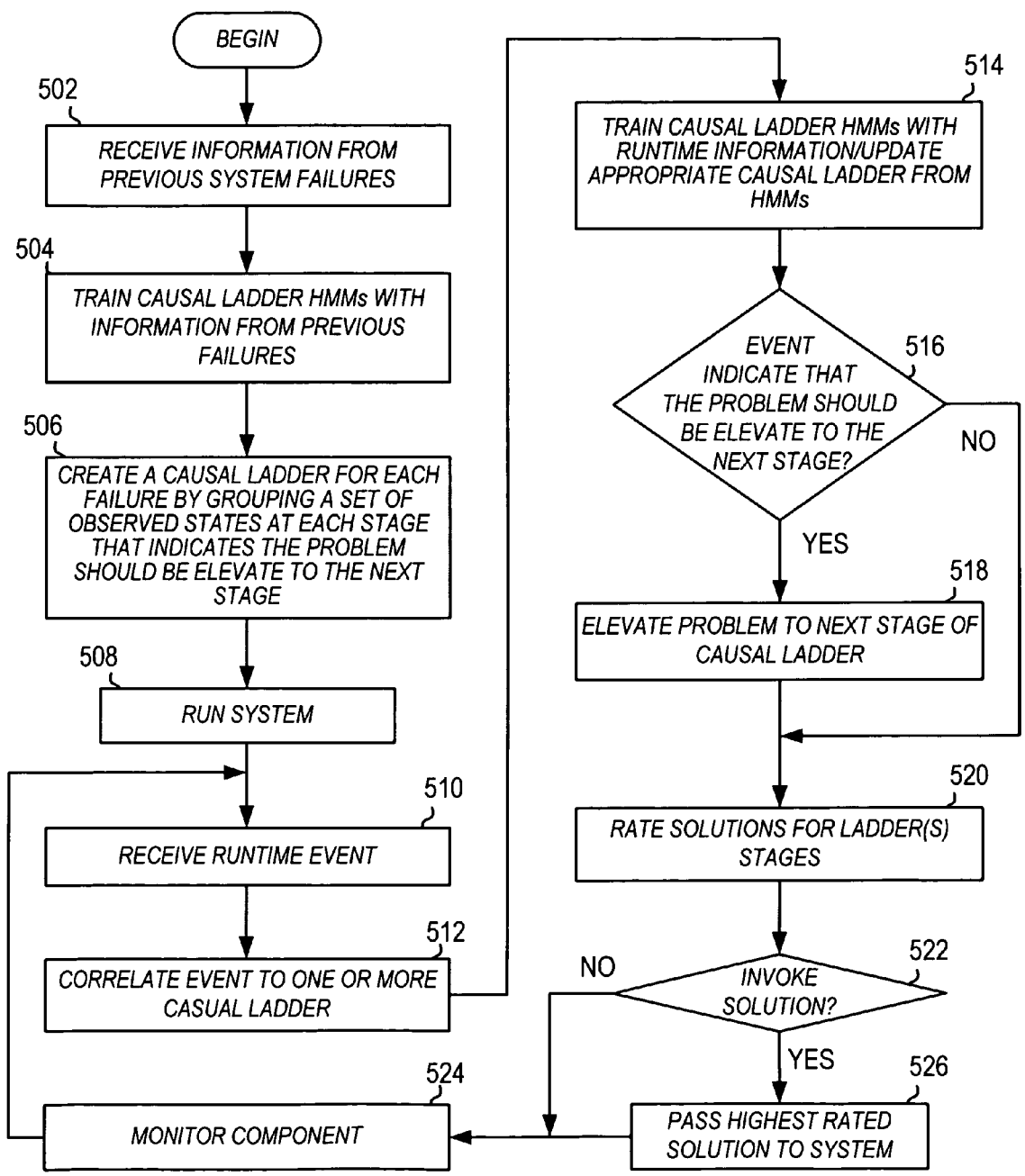
FIG. 5 is a flowchart depicting a method for proactive problem determination avoidance and recovery using a causal ladder mechanism in accordance with an exemplary embodiment of the present invention.

FIG. 5 is a flowchart depicting a method for proactive problem determination avoidance and recovery using a causal ladder mechanism in accordance with an exemplary embodiment of the present invention. The process begins by receiving information from previous component failures that resulted in a system crash (step 502) and then training scholastic models with the information (step 504). A causal ladder is assembled for each component problem that lead to component failure by grouping a set of observed events at each stage that indicates the problem should be elevate to a next higher causal stage. The completed causal ladders are then stored for reference in causal ladder database 234 in the runtime environment.

At runtime (step 508), the system outputs operation information, or events, concerning the system operation and the health of the system, typically in a standardized event formation (step 510). These runtime events are received at causal ladder engine 212 and passed to correlation engine 214. Correlation engine 214 attempts to correlate a runtime event to the observed events of an initial level of causal ladder in causal ladder database 234 (i.e., identifying a new potential component that is jeopardy of failing), or to the observed events grouped at a higher stage of a causal ladder for a component failure. The event may not correlate to a stage of any causal ladder if the particular component problem has never occurred or the system has been reconfigured such that a problem exhibits symptoms differently at a particular stage or stages. If the event does not correlate to a ladder, it may be necessary for human intervention for making correlation or, alternatively, assembling a completely new causal ladder for the problem. Conversely, the event may correlate to multiple causal ladders; in that case, the conflict between the causal ladders is resolved by considering each stage that the event correlates. If the event correlates to any stage of any causal ladder, the $T_{E\text{-}Failure}$ for each stage of every ladder is determined for the event. Simultaneously, the runtime event information is used by causal ladder builder 216 to train scholastic models associated with causal ladder and update appropriate event correlations for the causal ladders.

If a runtime event has previously correlated to a particular causal ladder, a current runtime even may indicate that the problem should be elevate to a next higher criticality stage of one or more causal ladder based on the policies for the particular stage. Policy engine 222 tests the event against the policies for the stage (step 516). If the policy indicates that the problem should be elevate to a next higher causal stage, that problem is elevated to the next higher stage for the particular causal ladder and new policies are invoked for that stage that control which remedies from symptom database 232 may provide a solution (step 518).

The potential solutions for the problem are retrieved from symptom database 232 for each causal ladder under consideration such that the repair time for implementing any potential solution may be accomplished in the estimated time prior to the failure (i.e., $T_{E\text{-}Failure} > T_{repair}$), i.e., if a repair can not be complete in the time period prior to the failure, that remedy is discarded, only for remedies that can be complete in the allotted time period are considered. The remaining solutions are then ranked by policies for that stage, past success rates, etc., and the highest ranking solution determined (step 522).

Next, and as mentioned above, a conflict may exist between causal ladders which may imply that more than one component is in jeopardy of failing. In that case, a decision is made whether or not to implement the highest ranking remedies immediately or to monitor the components for other signs of abnormal operation before invoking the fix (step 522). Typically a conflict between possible failures is resolved by allowing the problem to advance to the next higher stage of criticality, i.e., take a "wait and see" approach to determine which component is failing. Additionally, even if the event correlates to a lower level of only a single problem, it might be preferable to take a "wait and see" approach if it appears that implementing a fix will cause an excessive disruption in the system operation. In those situations, the suspect component, or components, is monitored (step 524) and the process iterates back to step 510. If, at step 522, one or both of the problems are in an elevate stage of the respective causal ladders, the highest ranking solutions are passed to the component, or components (step 526) and the suspect component (or components) is monitored to assess the effectiveness of the remedy (step 524). Again, the process iterates back to step 510. If after the estimate a time to failure ($T_{E\text{-}Failure}$) has elapse without receiving further correlation events, the causal ladder(s) is retired from correlation engine 214 to causal ladder database 234.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:

1. A method for proactive problem determination and component failure avoidance comprising:
   assembling a plurality of causal ladders, each of the plurality of causal ladders representing a plurality of sequential stages of criticality of a component problem that resulted in a system failure, wherein assembling a plurality of causal ladders comprises:
   receiving a plurality of failure events that resulted in a previous failure of a component;
   identifying a component problem related to an occurrence of each of the plurality of failure events;
   correlating each of the plurality of failure events to a discrete sequential stage of criticality in a causal ladder representing a respective identified component problem; and
   assigning at least one remedy to each discrete sequential stage of criticality of the causal ladder representing the respective identified component problem;
   for each of the plurality of sequential stages of criticality in each of the respective causal ladders, associating at least one remedy for a component problem;
   identifying a potential component failure from one of the plurality of causal ladders representing a component problem relating to the potential component failure, wherein identifying a potential component failure from one of the plurality of causal ladders comprises:
   receiving a runtime system event;
   correlating the received runtime system event to the at least one of the plurality of failure events correlated to a discrete sequential stage of criticality in one of the plurality of causal ladders representing the identified component problem; and
   determining a criticality of the identified component problem on the correlated discrete sequential stage of criticality in the causal ladder; and
   determining a problem solution for the component problem based on the one of the plurality of causal ladders representing the component problem, wherein determining a problem solution for the component problem comprises:

accessing policy associated with the correlated discrete sequential stage of criticality in the causal ladder;

ranking the at least one remedy for the correlated discrete sequential stage of criticality in the causal ladder representing the identified component problem based on policy associated with the correlated discrete sequential stage; and selecting a highest ranking solution for the identified component problem.

2. The method recited in claim 1, further comprising:

ranking the at least one remedy for the correlated discrete sequential stage of criticality in the causal ladder representing the identified component problem based on a previous performance in remedying the component problem.

3. The method recited in claim 2, wherein correlating the received runtime system event to the at least one of the plurality of failure events correlated to a discrete sequential stage of criticality in one of the plurality of causal ladders representing the identified component problem, further comprises:

determining an estimated time until failure for each of the plurality of sequential discrete stages of criticality in each of the plurality of causal ladders from a previous component problem; and associating the respective estimated time until failure with each of the plurality of sequential discrete stages of criticality in each of the plurality of causal ladders.

4. The method recited in claim 3, wherein assigning at least one remedy to each discrete sequential stage of criticality of the causal ladder representing the respective identified component problem, further comprises:

associating an estimated repair time to each of the at least one remedy for each discrete sequential stage of criticality of the causal ladder.

5. The method recited in claim 4, wherein determining a problem solution for the component problem based on the one of the plurality of causal ladders representing the component problem, further comprises:

for each remedy assigned to the correlated discrete sequential stage of criticality of the causal ladder:

identify all remedies having an estimated repair time that is greater than an to estimated time until failure; and excluding the identified remedies from ranking.

6. The method recited in claim 5, further comprising:

receiving a second runtime system event;

correlating the received second runtime system event to at least a second of the plurality of failure events assigned to second discrete sequential stage of criticality in one of the plurality of causal ladders representing the component problem, wherein at least one other runtime system event has correlated to the one of the plurality of causal ladders representing the component problem;

determining a second criticality of the component problem based the correlated second discrete sequential stage of criticality from the correlated causal ladder; and elevating criticality of the component problem based the correlated another discrete sequential stage of criticality from the correlated causal ladder.

7. The method recited in claim 6, further comprising:

accessing policy associated with the correlated second discrete sequential stage of criticality from the correlated causal ladder;

retrieving an estimated time until failure for the correlated second discrete sequential stage of criticality from the correlated causal ladder;

retrieving a plurality of remedies associated with the second correlated discrete sequential stage of criticality of the causal ladder representing the identified component problem;

retrieving an estimated repair time associated with each of the plurality of remedies associated with the second correlated discrete sequential stage of criticality;

identifying any remedies of the plurality of remedies with an associated estimated repair time that is greater than the estimated time until failure for the correlated second discrete sequential stage of criticality from the correlated causal ladder;

excluding the identified any remedies from the plurality of remedies;

ranking the plurality of remedies based on policy associated with the correlated second discrete sequential stage of criticality; and selecting a highest ranking of the plurality of remedies for the identified component problem.

8. The method recited in claim 1, further comprising:

constructing a hidden Markov model for each causal ladder.

9. A method for proactive problem determination and component failure avoidance comprising:

assembling a plurality of causal ladders, each of the plurality of causal ladders representing a plurality of sequential stages of criticality of a component problem that resulted in a system failure, wherein assembling a plurality of causal ladders comprises:

receiving a plurality of failure events that resulted in a previous failure of a component;

identifying a component problem related to an occurrence of each of the plurality of failure events;

correlating each of the plurality of failure events to a discrete sequential stage of criticality in a causal ladder representing a respective identified component problem; and assigning at least one remedy to each discrete sequential stage of criticality of the causal ladder representing the respective identified component problem;

for each of the plurality of sequential stages of criticality in each of the respective causal ladders, associating at least one remedy for a component problem;

identifying a potential component failure from one of the plurality of causal ladders representing a component problem relating to the potential component failure, wherein identifying a potential component failure from one of the plurality of causal ladders comprises:

receiving a runtime system event;

correlating the received runtime system event to the at least one of the plurality of failure events correlated to a discrete sequential stage of criticality in one of the plurality of causal ladders representing the identified component problem; and determining a criticality of the identified component problem based on the correlated discrete sequential stage of criticality in the causal ladder; and determining a problem solution for the component problem based on the one of the plurality of causal ladders representing the component problem, wherein determining a problem solution for the component problem comprises:

for each remedy assigned to the correlated discrete sequential stage of criticality of the causal ladder:
identify all remedies having an estimated repair time that is greater than an estimated time until failure; and
excluding the identified remedies from ranking;
accessing policy associated with the correlated discrete sequential stage of criticality in the causal ladder;
ranking the at least one remedy for the correlated discrete sequential stage of criticality in the causal ladder representing the identified component problem based on policy associated with the correlated discrete sequential stage; and
selecting a highest ranking solution for the identified component problem.

10. The method recited in claim 9, further comprising:
ranking the at least one remedy for the correlated discrete sequential stage of criticality in the causal ladder representing the identified component problem based on a previous performance in remedying the component problem.

11. The method recited in claim 9, wherein correlating the received runtime system event to the at least one of the plurality of failure events correlated to a discrete sequential stage of criticality in one of the plurality of causal ladders representing the identified component problem, further comprises:
determining an estimated time until failure for each of the plurality of sequential discrete stages of criticality in each of the plurality of causal ladders from a previous component problem; and
associating the respective estimated time until failure with each of the plurality of sequential discrete stages of criticality in each of the plurality of causal ladders.

12. The method recited in claim 9, wherein assigning at least one remedy to each discrete sequential stage of criticality of the causal ladder representing the respective identified component problem, further comprises:
associating an estimated repair time to each of the at least one remedy for each discrete sequential stage of criticality of the causal ladder.

13. The method recited in claim 9, further comprising:
receiving a second runtime system event;
correlating the received second runtime system event to at least a second of the plurality of failure events assigned to second discrete sequential stage of criticality in one of the plurality of causal ladders representing the component problem, wherein at least one other runtime system event has correlated to the one of the plurality of causal ladders representing the component problem;
determining a second criticality of the component problem based on the correlated second discrete sequential stage of criticality from the correlated causal ladder; and
elevating criticality of the component problem based on the correlated another discrete sequential stage of criticality from the correlated causal ladder.

14. The method recited in claim 9, further comprising:
accessing policy associated with the correlated second discrete sequential stage of criticality from the correlated causal ladder;
retrieving an estimated time until failure for the correlated second discrete sequential stage of criticality from the correlated causal ladder;
retrieving a plurality of remedies associated with the second correlated discrete sequential stage of criticality of the causal ladder representing the identified component problem;
retrieving an estimated repair time associated with each of the plurality of remedies associated with the second correlated discrete sequential stage of criticality;
identifying any remedies of the plurality of remedies with an associated estimated repair time that is greater than the estimated time until failure for the correlated second discrete sequential stage of criticality from the correlated causal ladder;
excluding the identified any remedies from the plurality of remedies;
ranking the plurality of remedies based on policy associated with the correlated second discrete sequential stage of criticality; and
selecting a highest ranking of the plurality of remedies for the identified component problem.

15. A method for proactive problem determination and component failure avoidance comprising:
assembling a plurality of causal ladders, each of the plurality of causal ladders representing a plurality of sequential stages of criticality of a component problem that resulted in a system failure, wherein assembling a plurality of causal ladders comprises:
receiving a plurality of failure events that resulted in a previous failure of a component;
identifying a component problem related to an occurrence of each of the plurality of failure events;
correlating each of the plurality of failure events to a discrete sequential stage of criticality in a causal ladder representing a respective identified component problem; and
assigning at least one remedy to each discrete sequential stage of criticality of the causal ladder representing the respective identified component problem;
for each of the plurality of sequential stages of criticality in each of the respective causal ladders, associating at least one remedy for a component problem;
identifying a potential component failure from one of the plurality of causal ladders representing a component problem relating to the potential component failure, wherein identifying a potential component failure from one of the plurality of causal ladders comprises:
receiving a runtime system event;
correlating the received runtime system event to the at least one of the plurality of failure events correlated to a discrete sequential stage of criticality in one of the plurality of causal ladders representing the identified component problem, wherein correlating the received runtime system event to the at least one of the plurality of failure events correlated to a discrete sequential stage of criticality in one of the plurality of causal ladders representing the identified component problem, further comprises:
determining an estimated time until failure for each of the plurality of sequential discrete stages of criticality in each of the plurality of causal ladders from a previous component problem; and
associating the respective estimated time until failure with each of the plurality of sequential discrete stages of criticality in each of the plurality of causal ladders; and
determining a criticality of the identified component problem based on the correlated discrete sequential stage of criticality in the causal ladder; and determining a problem solution for the component problem based on the one of the plurality of causal ladders representing the component problem, wherein determining a problem solution for the component problem comprises:

accessing policy associated with the correlated discrete sequential stage of criticality in the causal ladder;

ranking the at least one remedy for the correlated discrete sequential stage of criticality in the causal ladder representing the identified component problem based on policy associated with the correlated discrete sequential stage; and selecting a highest ranking solution for the identified component problem.

16. The method recited in claim 15, further comprising:
ranking the at least one remedy for the correlated discrete sequential stage of criticality in the causal ladder representing the identified component problem based on a previous performance in remedying the component problem.

17. The method recited in claim 15, wherein assigning at least one remedy to each discrete sequential stage of criticality of the causal ladder representing the respective identified component problem, further comprises:

associating an estimated repair time to each of the at least one remedy for each discrete sequential stage of criticality of the causal ladder.

18. The method recited in claim 15, wherein determining a problem solution for the component problem based on the one of the plurality of causal ladders representing the component problem, further comprises:

for each remedy assigned to the correlated discrete sequential stage of criticality of the causal ladder:

identify all remedies having an estimated repair time that is greater than an estimated time until failure; and excluding the identified remedies from ranking.

19. The method recited in claim 15, further comprising:
receiving a second runtime system event;
correlating the received second runtime system event to at least a second of the plurality of failure events assigned to second discrete sequential stage of criticality in one of the plurality of causal ladders representing the component problem, wherein at least one other runtime system event has correlated to the one of the plurality of causal ladders representing the component problem;

determining a second criticality of the component problem based on the correlated second discrete sequential stage of criticality from the correlated causal ladder; and elevating criticality of the component problem based on the correlated another discrete sequential stage of criticality from the correlated causal ladder.

20. The method recited in claim 15, further comprising:
accessing policy associated with the correlated second discrete sequential stage of criticality from the correlated causal ladder;

retrieving an estimated time until failure for the correlated second discrete sequential stage of criticality from the correlated causal ladder;

retrieving a plurality of remedies associated with the second correlated discrete sequential stage of criticality of the causal ladder representing the identified component problem;

retrieving an estimated repair time associated with each of the plurality of remedies associated with the second correlated discrete sequential stage of criticality;

identifying any remedies of the plurality of remedies with an associated estimated repair time that is greater than the estimated time until failure for the correlated second discrete sequential stage of criticality from the correlated causal ladder;

excluding the identified any remedies from the plurality of remedies;

ranking the plurality of remedies based on policy associated with the correlated second discrete sequential stage of criticality; and selecting a highest ranking of the plurality of remedies for the identified component problem.

* * * * *